United States Patent
Hata

[19]

[11] Patent Number: 5,811,974
[45] Date of Patent: Sep. 22, 1998

[54] TECTONIC ACTIVITY MONITORING EQUIPMENT

[75] Inventor: Masayasu Hata, tajimi, Japan

[73] Assignee: Research Development Corporation of Japan, Saitama, Japan

[21] Appl. No.: 709,805

[22] Filed: Sep. 10, 1996

[30] Foreign Application Priority Data

Sep. 13, 1995 [JP] Japan .................................. 7-262403

[51] Int. Cl.⁶ .............................. G01V 3/08; G01V 3/40
[52] U.S. Cl. ......................... 324/344; 324/323; 324/345; 324/348
[58] Field of Search ................................... 324/323, 334, 324/335, 344, 345, 347, 348; 340/601, 690

[56] References Cited

U.S. PATENT DOCUMENTS 3,136,943  6/1964  Slichter .................................. 324/344
4,825,165  4/1989  Helms et al. ......................... 324/344

OTHER PUBLICATIONS

Masayasu Hata and Deiji Yabashi, 1994, Observation of ELF Radiation Related to Volcanic and Earthquake Activities. Electromagnetic Phenomena Related to Earthquake Prediction, pp. 159–174.

Primary Examiner—Walter E. Snow
Attorney, Agent, or Firm—McGlew and Tuttle

[57] ABSTRACT

The present invention relates to realize a tectonic activity monitoring equipment providing apparatus and method to detect a feeble electromagnetic wave occurred by the tectonic activity with a high signal-to-noise ratio (S/N) and to predict earthquake and volcano eruption. The apparatus and the method for monitoring tectonic activity of the present invention comprises electromagnetic wave sensors and one or more of amplifiers for amplifying signals detected by the sensors. And an observation frequency for detecting electromagnetic wave occurred from tectonic activity is set to a frequency between a few tens Hz and 1 kHz so as to eliminate the influence of noises of a strong radiation power less than a few tens Hz and tropical thunder noises of more than 1 kHz of higher order modes propagating between the earth and the ionosphere.

16 Claims, 7 Drawing Sheets

BASALT
VITREOUS MATTER

PERIDOTITE

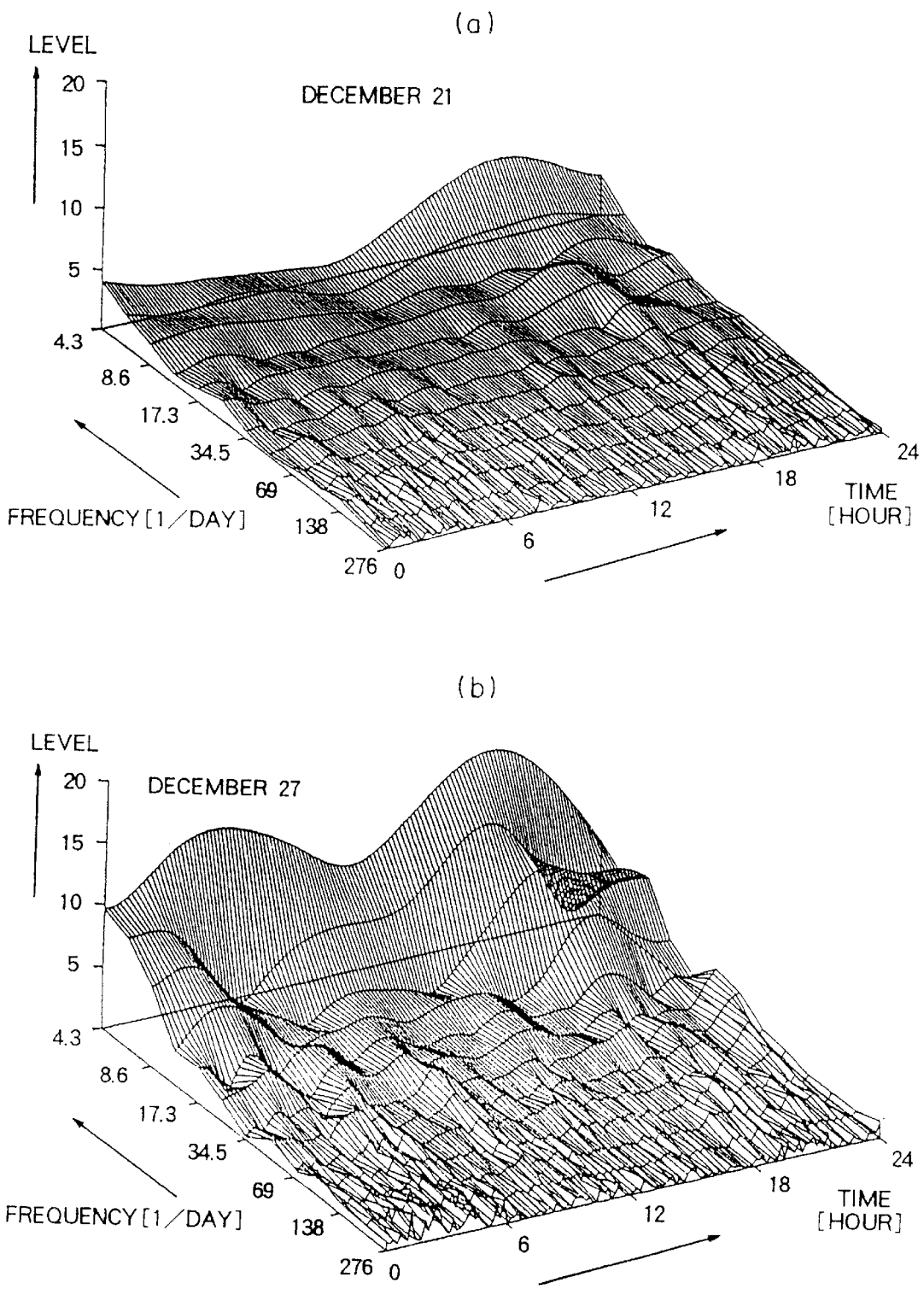

LOOP COIL WITH DOUBLE SHIELD CIRCLE

TECTONIC ACTIVITY MONITORING EQUIPMENT

FIELD OF THE INVENTION

Great damage may be caused by earthquakes and volcanic eruptions resulting in significant disasters. Such disasters happen abruptly such that there is not sufficient time to follow counter plans or other procedures. If it is possible to sense a certain precursory phenomenon and to take action based on this sensing, a significant reduction of damage can be realized. The invention relates to equipment for monitoring tectonic activity which equipment detects the precursory activity of earthquakes and volcanic eruptions by observing an electromagnetic wave anomaly in the atmosphere.

DESCRIPTION OF RELATED ART

It is known up to this time that fluctuations of underground water levels, constituents of released gas, abnormal actions of animals and the like can be observed and these can be precursory phenomenon, other than radio wave noise, which can indicate volcanic eruption or an earthquake. However these are not fully utilized as they are difficult to reproduce or the indications are unclear, the mechanism underlying these observable phenomena are unclear. Many studies for predicting earthquakes have been attempted involving the technical field of electromagnetics. However, no certain precursor has been observed. For example, the DAN method of observing the earth current is known. However the possibility of use as well as the condition of noisy regions are unclear. Actual results have been obtained only in Greece for this. It is not obvious or clear as to whether it may be applied generally. Accordingly, the prior art does not present a system having a clear design condition for the prediction of earthquakes and volcanic eruptions.

An object of this invention is to realize a tectonic activity monitoring apparatus possible to predict earthquakes and volcanic eruption by sensing stably and high sensibly the precursory electromagnetic wave anomaly based on the exact understanding of the mechanism of the anomaly occurrence.

SUMMARY OF THE INVENTION

The present invention relates to the realization of a tectonic activity monitoring equipment providing means to detect a feeble electromagnetic wave occurring due to tectonic activity with a high signal-to-noise ratio (S/N) and to predict earthquakes and volcano eruptions.

In the earth region, there are many natural noises and artificial noises which issue from various power supply apparatuses. They have a strong radiation power spectrum of electromagnetic waves of less than a few tens Hz. And tropical thunderstorms occur which result in noises and their higher order mode of more than 1 kHz which propagates between the earth and the ionosphere.

As an embodiment, the apparatus for monitoring tectonic activity of the present invention comprises one or more electromagnetic wave sensors and one or more of amplifiers for amplifying signals detected by the sensors. And an observation frequency for detecting any electromagnetic wave occurring due tectonic activity is set to a frequency between a few tens Hz and 1 kHz so as to eliminate the influence of noises of a strong radiation power less than a few tens Hz and tropical thunder noises of more than 1 kHz of higher order modes propagating between the earth and the ionosphere.

Further, there are many electromagnetic noises radiated from power supply devices of various apparatuses, and they are also input into the sensors, along with low frequencies about 7 Hz~21 Hz which occur in nature. Therefore, their noise frequencies should be eliminated from received signals for observing tectonic activity.

As an embodiment, the observation frequency of the present invention is set to a frequency so as to avoid frequencies near of integer times of power supply frequencies of the apparatuses, and to be prime to each frequency component of power supply frequencies. And each amplifier has a narrow band width which is set to a frequency less than the minimum frequency component of the power supply frequencies.

The sensor has a capacitor to make a resonating circuit with a loop coil of the sensor. And the resonance frequency is set to the observing frequency for detecting the electromagnetic wave issued from the tectonic activity.

As an embodiment, the apparatus for monitoring tectonic activity has sensors which are loopcoils or loopcoils connecting with capacitors, and the resonating frequency of each sensor accords with the observation frequency. And influences of strong interference noises occurring from commercial power supplies are reduced for the reason of resonating the sensors with the observation frequency occurred by tectonic activity.

And as an embodiment, the electromagnetic sensor comprises double circle shields for avoiding high frequency noise. Each of two circle shields has a cut section for cutting circumference direction current. Low frequency magnetic component can be detected because of the cutting section, but high frequency noises can be shielded. A little high frequency noise is received between a gap of the cutting section. Therefor, the cutting sections are set opposite for the center of the shield circle each other to avoid noise signals detected at the gap.

For detecting the observation frequency of electromagnetic waves issued from tectonic activity, the amplifiers of the apparatus of this invention are narrow band width amplifiers with band eliminating filters, and the band width of band eliminating filter is narrow. And plural amplifiers are connected serially for obtaining a wide dynamic range, and the receiving signals of electromagnetic waves which have occurred by tectonic activity is amplified gradually with the serially connected amplifiers as eliminating commercial power supply noises.

Further, as an embodiment, with the amplifiers of apparatus for monitoring tectonic activity of the present invention, the receiving signal of electromagnetic wave issued from the tectonic activity is converted to a lower frequency so as to make narrow its frequency band width at lower frequency region.

A system for monitoring tectonic activity is composed of the tectonic activity monitoring apparatuses placed at plural observation points and an observing center, and electromagnetic waves issued from tectonic activity may be detected with a method of this invention.

The system comprises electromagnetic wave sensors and amplifiers for amplifying detecting signals of the sensors and data processing device, and each electromagnetic sensor is composed of some parts so as to detect a horizontal magnetic component and a vertical magnetic component of electromagnetic wave issued from tectonic activity. A method for the observing tectonic activity is that observation frequency for detecting the electromagnetic wave occurred from tectonic activity is set to frequency between a few tens Hz and 1 kHz so as to eliminate the influence of noises of strong radiation power less than a few tens Hz and tropical thunder noise of more than 1 kHz of higher order modes propagating between the earth and the ionosphere. And an anomaly of a horizontal magnetic component of electromagnetic wave occurred by tectonic activity can be found, and an incoming direction can be sensed by an intensity deference between intensities of two directions being rectangular each other. And a focus region can be found as an overlap region of the detected incoming directions of electromagnetic waves of plural observation points.

As an embodiment, the observation frequency of a method is set to a frequency so as to avoid frequency near integer times of power supply frequencies and to be prime to each frequency component of power supply frequencies. And each amplifier has a narrow band width which is set to frequencies less than the minimum frequency component of the power supply frequencies.

Extension of microcracks at the mantle layer of a trench plate results in the occurrence electromagnetic wave. A method for monitoring tectonic activity of this invention detects the electromagnetic wave which occurred upon the extension of microcracks in the mantle layer.

The sensors that are placed near on shear destruction region or fault destruction region in mantle layer of trench plate detect a vertical magnetic field anomaly.

As an example, a method for monitoring tectonic activity of this invention is that the sensors are located sporadically at various points, and sense a moment of shear destruction or fault destruction in the mantle layer of the trench plate by detection of a vertical magnetic field anomaly. And a distance to the focus region is estimated by time deference of the observed time of the shear destruction or the fault destruction at plural observation points.

An anomaly of the horizontal magnetic field is observed when the observation point is distance from the focus region, and an anomaly of vertical magnetic field is observed, when the observation point is near the focus region that is an inner land earthquake. From these observation results, a scale of predicted earthquake can be estimated.

As an example, a method for monitoring tectonic activity of this invention predicts the scale of predicted earthquake by referring to past data about the anomaly level of horizontal magnetic field, the anomaly level of vertical magnetic field component and the estimated distance to the focus region.

The days from the moment of destruction of the basalt layer of an upper layer of mantle to the occurrence of destruction of the basalt layer of an upper layer of mantle, that is a result of the earthquake, relates to the earthquake scale.

As an embodiment, method for tectonic activity monitoring of this invention estimates days from shear destruction or default destruction until the destruction of the basalt layer of an upper layer of mantle, namely predicting the days of the occurrence of the earthquake, by the predicated scale of the earthquake.

Change of electric conductivity of underground earth crust which is a precursor of earthquake causes an anomaly of the horizontal magnetic field of electromagnetic wave issued from a thunder.

As an embodiment of a method for monitoring tectonic activity of this invention, when changes of variation aspect of vertical magnetic component during days on which anomaly horizontal magnetic component appears show their aspect not been seen until then, the change of the vertical magnetic field is output as information showing a change of electric conductivity of the underground earth crust.

BRIEF DESCRIPTION OF THE DRAWINGS

In the Drawings:

FIG. 4A is a diagram showing spectrum charts by wavelet transformation of an observation result;

FIG. 4B is a diagram showing spectrum charts by wavelet transformation of an observation result;

DESCRIPTION OF PREFERRED EMBODIMENTS

Figure 1:
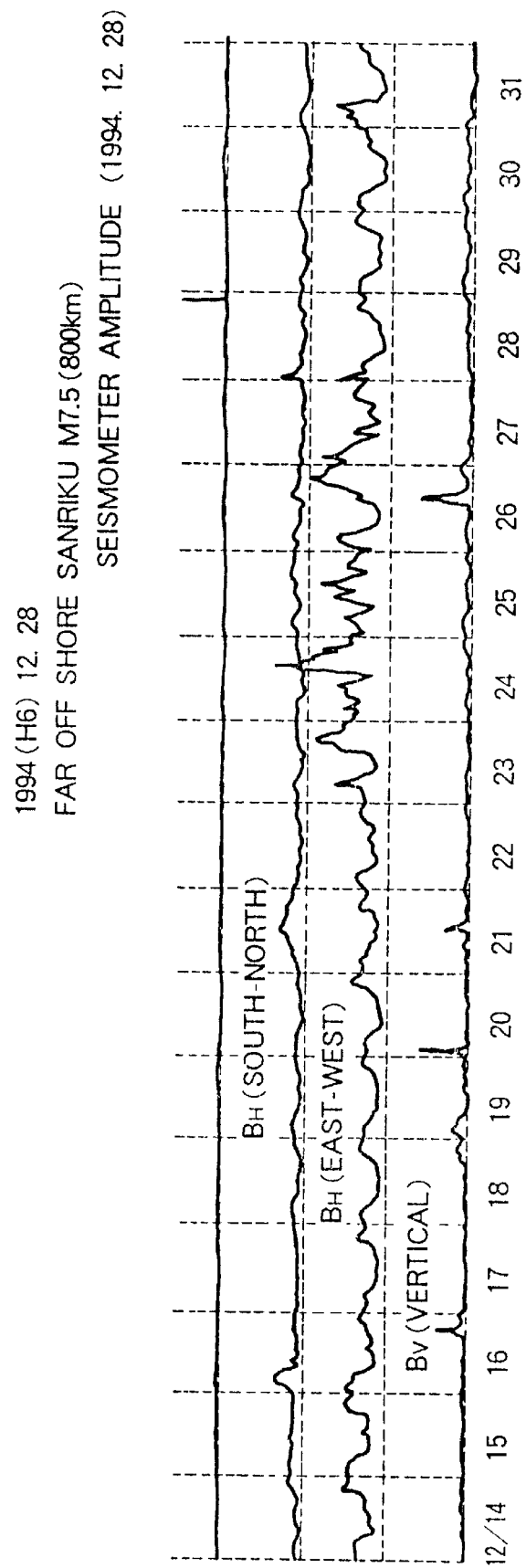
FIG. 1 is a diagram showing a typical observation result as an example.
Figure 2:
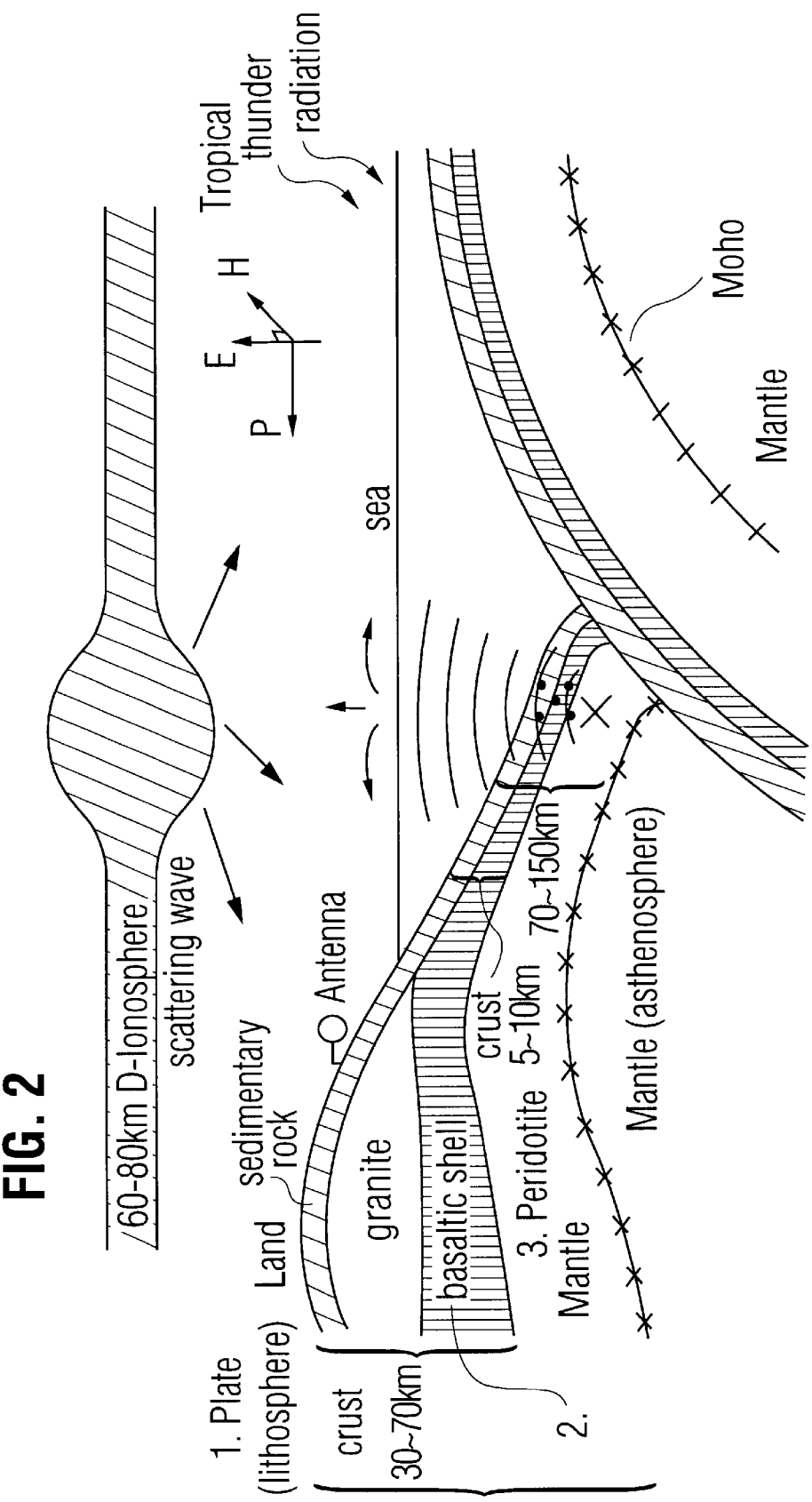
FIG. 2 is a model chart of crust structure.

The following embodiments are described by referring to an observation result of the earthquake of far off shore Sanriku of M7.5 on Dec. 18, 1994. FIG. 1 shows one of observation results observed by a high sensibility receiver of 223 Hz of ELF band shown as an example. In the figure, the wave shown on the top figure is the amplitude of seismometer, a wave HB (SOUTH–NORTH) of the second from the top is the intensity of horizontal magnetic flux, a wave BH (EAST–WEST) of the third from the top is the intensity of vertical magnetic flux, a wave BV (VERTICAL) of the lowest figure is the intensity of horizontal magnetic flux. It shows that the fluctuation of the level of vertical magnetic increases since about a week before and disappears on the day of earthquake. It has been cleared that the observation result is a general characteristic same as shown in cases of trench type earthquakes.

It is cleared that the result is derived from the difference of rock characteristic between two layers (basaltic shell 2 and peridotite 3) of the rock composing the plate 1. A basaltic shell of the upper plate layer has the ductility, on the other hand, a peridotite layer 3 of the lower plate layer of which crystals are grown is hard and fragile. Therefore, the peridotite layer 3 of the lower plate layer is destroyed early, and the basalt layer 2 of the upper layer is destroyed a few days after the destruction of the peridotite layer 3.

Figure 3A:
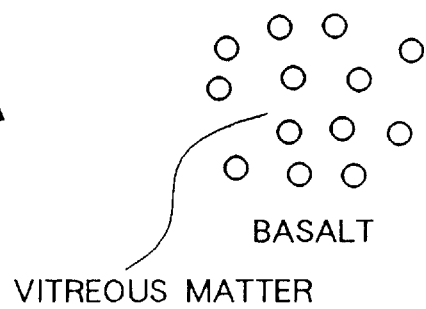
FIG. 3A is an illustration of a structure of basalt.
Figure 3B:
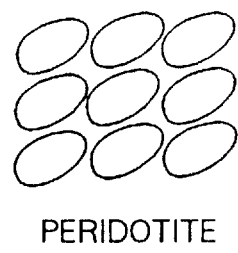
FIG. 3B is an illustration of a structure of peridotite.

FIGS. 3A and 3B show each structure of two kinds of the rock. FIG. 3A shows a structure of basalt. The crystal in basalt is small, and the space between crystals is filled with vitreous matters. FIG. 3B shows a structure of peridotite, and the crystal in peridotite is great and the crystal direction is regulated.

When the strain is applied to the mantle, minute cracks begin to occur and they spreads gradually, and when the force maintaining the layer stability is lost, the break plane spreads in an instant by the shear destruction or the fault destruction. During the process, crystal bonds are torn on the atoms level and their biding energy between electrons and atoms is transformed to ionization or electromagnetic energies.

FIG. 4 shows a result of wavelet transformation of the observation result of FIG. 1 to obtain frequency components. An upper figure on the FIG. 4 shows data of a quiet day, and a lower figure on the FIG. 4 shows a previous day of the earthquake. It is shown that, in the lower figure, frequency components of from a few hundreds seconds to more than a few thousands seconds increase.

As shown in FIG. 4, it is shown clearly that levels of a low frequency and period of a few hours are prominent. And also, as shown on the vertical magnetic field chart on FIG. 1, some burst like signals appear for a short time of a few hours during a disturbed period of a horizontal magnetic field. It is considered that the mantle is destroyed by the shear destruction or the fault destruction at this time. In a moment of the mantle destruction, a great stress occurs and causes a strong pressure, and it spreads rapidly for the periphery of the mantle. The pressure propagates to the extent of 1000 km, so it propagated for 700 km and reached to the underground of Omaezaki observation point, and the pressure for the crust changed the electric characteristics, especially electric conductivity of the crust. On the other hand, it is known that in the aquifer of which porous rocks contain water, the change of electric conductivity caused by the pressure becomes to a few hundreds time of change of strain characteristics. As the result, it is guessed form the fact that the great change of electric conductivity causes the flow lines of earth current, and it causes the burst-like anomaly of vertical magnetic field.

As the electromagnetic wave occurring in a moment of the rock destruction caused by the distortion stress in the crust and plate under the trench is very low frequency (period of a few hundreds seconds~a few thousands seconds in the case of trench type, long frequency components more than a few ten seconds in case of inland earthquake), they propagate in the crust and the seawater (for distance of about 7 km) with low loss, and they cause a strong electric field and magnetic field. The low frequency component disturbs electrons of a lower layer of ionosphere. And also a strong and low frequency component electromagnetic wave causes the glow discharge in the air and corona discharges (about a few hundreds thousand Volt per one meter), moreover they cause spark discharges (a few millions Volt per one meter). The secondary noise occurs from these discharges and low frequency components of a few Hz and also high frequency components of from a few hundreds to a few MHZ appear, these frequency components can be observed as a precursory noise, and as the frequency is higher than the plasma frequency (a few tens~a few hundreds kHz) of the D layer, they transparent in the lower ionization layer, and cause the disturb in the F layer of 250 km upper.

Like this, the secondary noise occurs during the propagation of low frequency component of electromagnetic wave caused by the crust distortions, the extension of minute destruction and the rock destruction, and the thunder noise occurred in tropics as the result of the disturbance occurred in the D layer of ionosphere layer are scattered during the propagation, and their level change is observed as the precursory. By the way, in the case of an inland earthquake, the electromagnetic wave of from short wave range to VHF range are scattered by the influence of an F layer disturbance. These noises and the scattered electromagnetic wave in air propagate principally as the horizontal magnetic field component, and sensors placed far away from focus regions detect the horizontal magnetic field. Therefore, the precursory disturbance of the electric wave can be detected by a loop antenna for detecting horizontal magnetic field.

When the distortion is applied to the crust, electric characteristics of rock, especially electric conductivity of the aquifer containing water, has a large change because of the distortion. And it causes changes of the vertical magnetic field component of electromagnetic wave for an observation point place upper the distorted region. So the component of vertical magnetic field of the electromagnetic wave issued from the near region can be sensed by a coil for detecting vertical magnetic components.

Originating as a change of conductivity, changes of the earth current etc., occur and the flow line of the current changes. On the other hand the difference of flow lines are equivalent to a loop current, therefore these changes of the flow lines cause the loop current and the vertical magnetic field generated by this loop current are received by loop coils.

Also a remarkable feature is observed for the observation of the vertical magnetic field. When the electromagnetic wave of thunder (such as a tropical thunderstorm noise) comes to the sensors, horizontal electric fields and magnetic fields of the electromagnetic component only are observed generally. On the other hand, when it incomes to a place under which electric conductivity of crust becomes great, the vertical magnetic field is generated because of the great electric conductivity of the under ground crust. Therefor, the anomaly of the vertical magnetic field appears as a result of the change of electric conductivity localized at the under ground crust.

Figure 8:
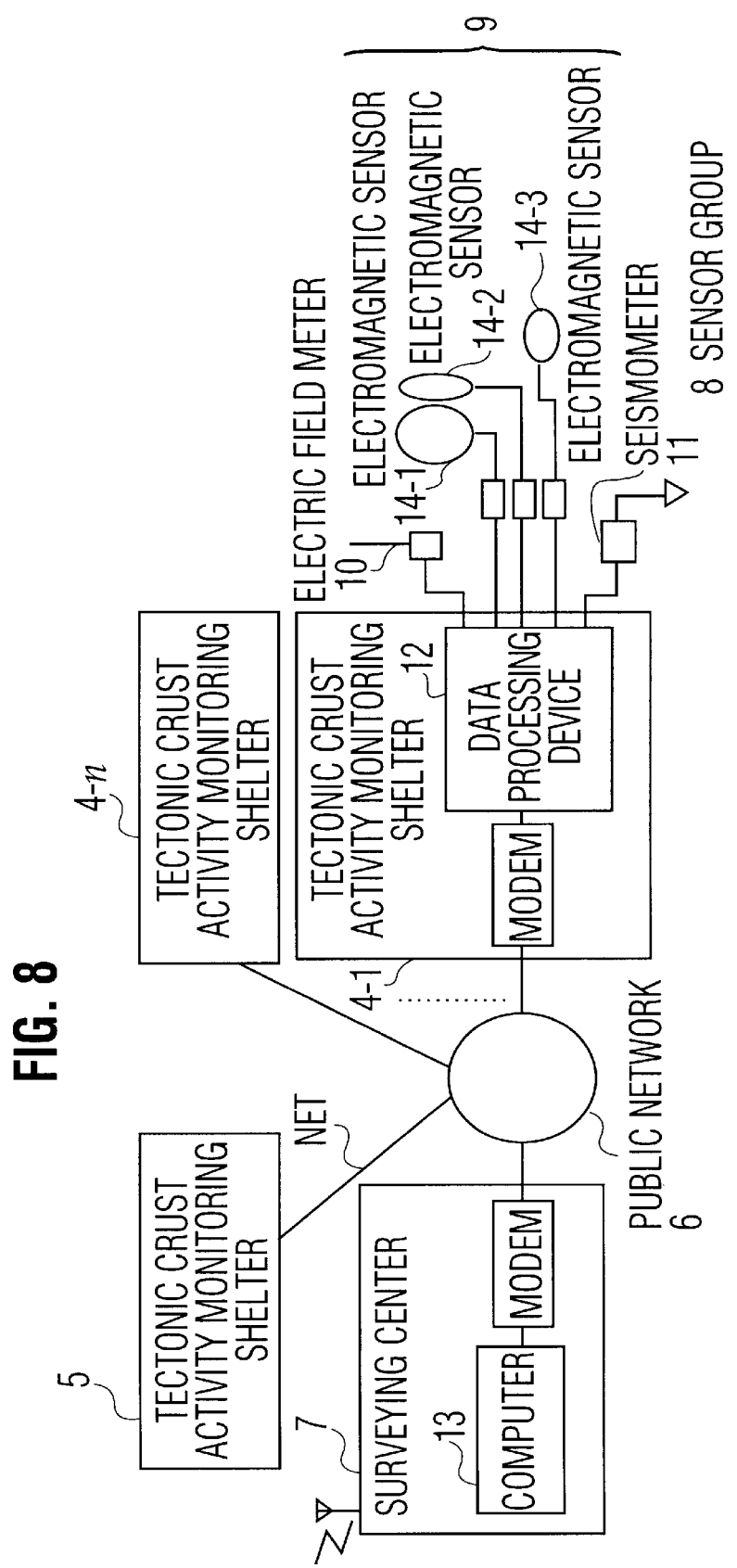
FIG. 8 is an example of tectonic activity monitoring system.

FIG. 8 shows a tectonic activity monitoring system. The apparatus for monitoring tectonic activity is composed of a sensor group 8, a data processing device 12 and a modem. The data processing device 12 and the modem are contained in a tectonic crust activity monitoring shelter 4-1. Plural tectonic activity monitoring equipment 4-1–4-n and each sensor group (not shown) are placed sporadically at plural observing points, and the tectonic activity monitoring shell 5 and its sensor group (not shown) is placed in a region distant from the other observation points to refer and compare the observed data with the observed data of the other observing points. Each apparatus for monitoring tectonic activity is connected to a surveying center 7 through the public network 6. Each apparatus for monitoring the tectonic activity has the same composition. Therefore, only the apparatus for monitoring the tectonic activity composed of the tectonic crust activity monitoring shelter 4-1 and the sensor group 8 is shown in detail for simplicity. The explanation on the apparatus for monitoring tectonic activity composed of the data processing device 12, the modem and the sensor group 8 is applied to the other apparatus for monitoring tectonic activity in followings.

The apparatus for monitoring tectonic activity provides an electromagnetic sensor 9, an electric field observation device 10, a seismometer 11 as all sorts of sensors group 8. Output signals of these sensors are input into a data processing device 12, and their data are stored and processed to find out the precursory. The processed data are sent to a computer 12 of the surveying center 7 through the public network 6, and analyzed by comparing each other with all data from the all other tectonic activity monitoring apparatus and a past database. As the result, the decision of the focus region, the scale of earthquake, the prediction of occurrence date of earthquake etc. are obtained.

Electro-magnetic sensors 9 are composed of small size loop antennas having three loop coils 14-1, 14-2, 14-3 located right angle each other, and receivers for receiving the crust activity. Each loop coil 14-1, 14-2, 14-4 is connected to receiver of itself.

Figure 5:
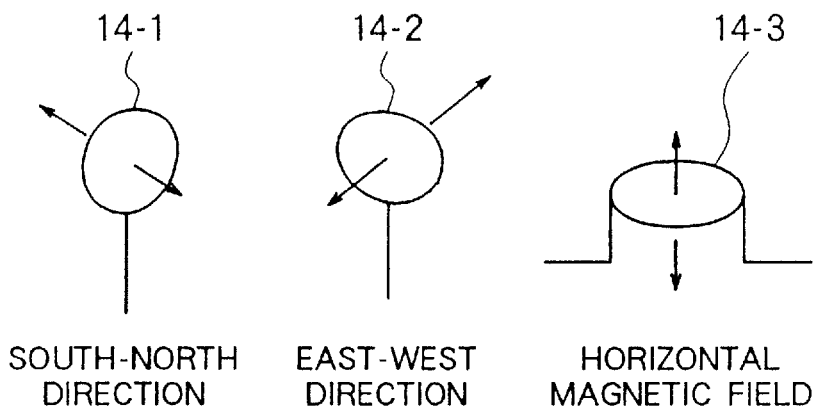
FIG. 5 is a diagram showing setting directions of antenna.
Figure 6:
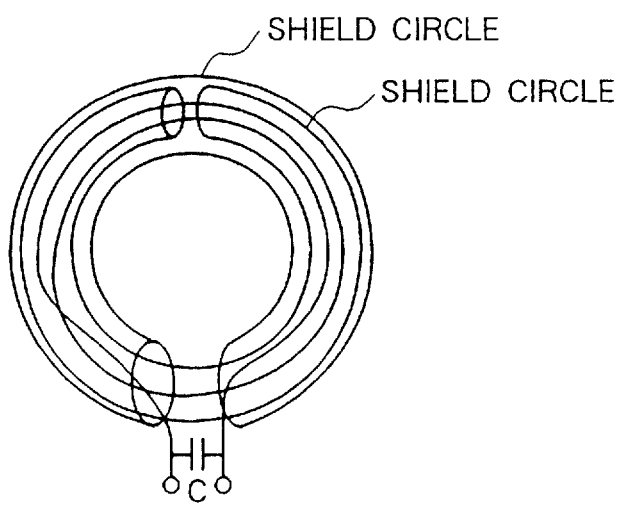
FIG. 6 is a chart of antenna formation having double circle shields.

As shown in FIG. 5, each loop coil 14-1, 14-2, 14-3 of a small loop antenna senses each of three magnetic components including the east–west horizontal direction, the south–north horizontal direction, the vertical direction which are the magnetic component of three axis direction in the air. Namely an induced voltage proportional to the change of magnetic flux through the loop coil is observed between terminals of the coil. The interference noise of a commercial power supply is reduced by attaching in parallel a condenser C to the antenna, as shown in FIG. 6, so as to resonate with the observing frequency of electromagnetic wave, and signal to noise ratio at input terminals is ameliorated by this structure. It is effective to use a loop antenna providing double circle shields, each of which has a section for cutting a circumference direction current as shown in FIG. 6. The sizes of two shield circles are different each other, and the sections are set opposite for the center of the circle each other.

Figure 7:
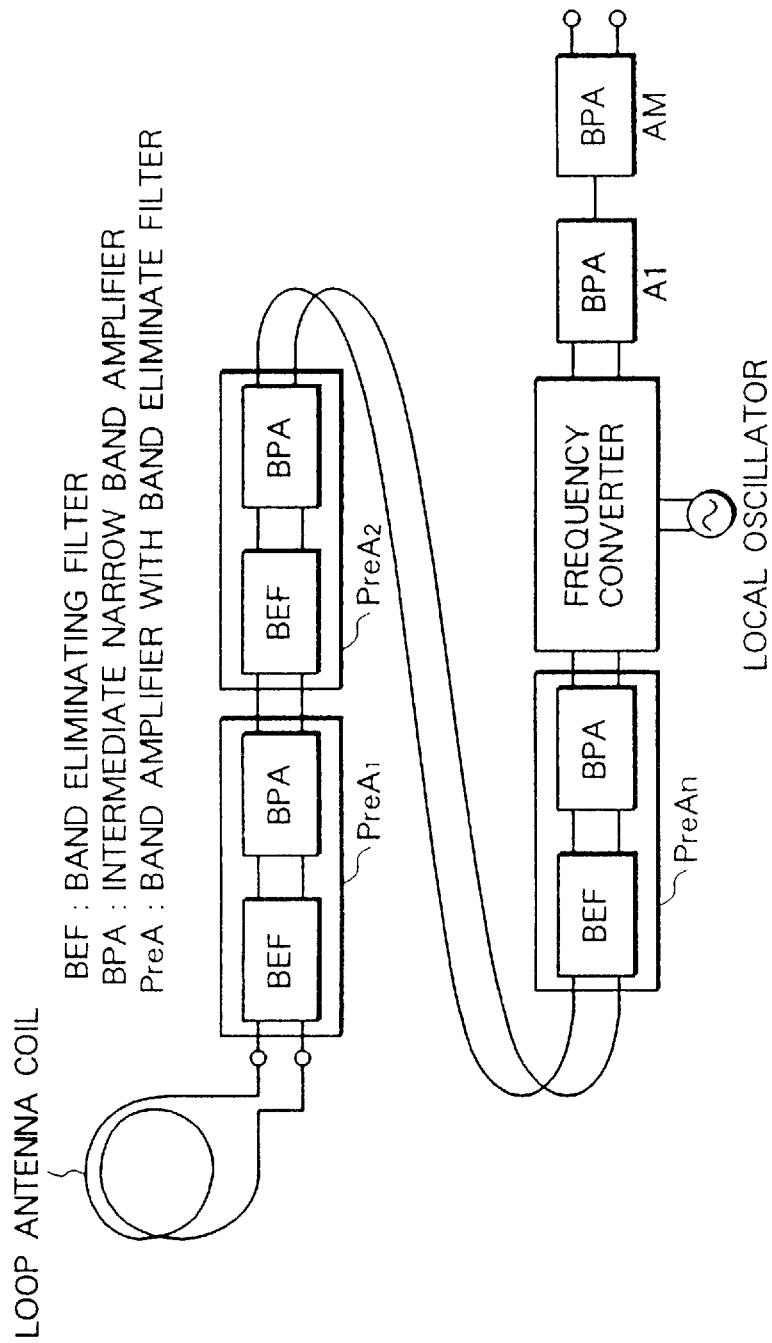
FIG. 7 is a device structure of receiver for observing the tectonic activity.

Output signals of each coil 14-1, 14-2, 14-3 are input into each receiver of the tectonic activity monitoring apparatus shown in FIG. 7. As shown in FIG. 7, the input signals of observation frequency are amplified by the multistep preamplifier PreA1~PreAn connected serially. Each preamplifier is composed of a narrow band amplifier (BPA) and electric circuit filter (BEF) having the function eliminating commercial power supply frequencies and its higher order frequency components. And the signals amplified by preamplifiers is converted to an intermediate frequency of a lower frequency by a frequency converter and the intermediate frequency signals are amplified with narrow band amplifiers (BPA) A1~AM having a good band characteristic. Through these amplifying steps, the signals are amplified effectively to eliminate great noise which occurs from commercial apparatus and their interference. And further, electromagnetic waves radiated from the crust activity relating to earthquake and volcanic activity can be sensed with a high sensitivity by using amplifiers having a wide dynamic range of amplification, by setting the observation frequency to prime with commercial power supply frequency and by setting the band width narrower than minimum frequency components of commercial power supply frequency for eliminating the interference with commercial power supply noise.

It is preferable to set a main observation frequency between a few tens–1 k Hz for avoiding the interference with frequencies less than a few tens Hz which are in nature and radiated from various power supply devices. The other reason is following. Guide paths of a high dimension mode for frequency more than 1 kHz exist between the earth and the D ionization layer, if the observation frequency is set to the frequency of more than 1 kHz, noise radiated from a distant tropical thunder etc. are received complexly. Therefore, the observation frequency is set to the above mentioned frequency in this invention.

As shown in FIG. 8, a computer 13 at a surveying center 7 gathers data of electromagnetic wave received by each tectonic activity monitoring equipment 4-1~4-n, and processes them for reasoning and learning and predicts the earthquake with a high exactitude. During these processes, the exactitude is ameliorated by comparing data of the tectonic activity monitoring apparatus 5 for referring and comparing the observed data.

Methods for monitoring tectonic activity of a tectonic activity monitoring system shown in the figure is as follows.

a. the horizontal magnetic field anomaly of electromagnetic wave which occurred from the extension of a micro-crack in the mantle layer of the trench plate is sensed by the tectonic activity monitoring shelter 14-1–14-n located sporadically at plural observation points, and an incoming direction is estimated by intensity deference between two directions rectangular each other. A computer 13 at the surveying center finds the overlap region of incoming directions of electromagnetic waves that the tectonic activity monitoring component have detected, and estimate the overlap region as the focus region.

b. A vertical magnetic field anomaly caused by the moment of shear destruction or the fault destruction in the mantle layer of trench plate is sensed by the tectonic activity monitoring apparatus located sporadically at plural observation points, and the computer 13 estimates the distance to the focus region by the difference of time that each tectonic activity monitoring apparatus has sensed the shear destruction.

c. The computer 13 of the surveying center process as to estimate the scale of the predicted earthquake by the anomaly level of horizontal magnetic field components, the anomaly level of vertical magnetic field components and the estimated distance to the focus, and by making reference with these to past observed data.

d. The computer 13 of surveying center processes to estimate days until the occurrence of the earthquake, namely days from the shear destruction or the fault destruction in the mantle layer to the destruction of the basaltic shell of upper layer of mantle, and the estimated scale of earthquake.

e. When changes of a variation aspect of the vertical magnetic component are noted during days on which the anomaly horizontal magnetic component appears and this shows their aspect which has not been seen until then, the computer 13 outputs it as information showing change of electric conductivity of the underground earth crust.

As mentioned above, by this invention a feeble electromagnetic wave of precursory of earthquakes and volcano eruptions can be detected. Therefore, this invention is useful for applying the prediction system for earthquake and volcano eruption.

What I claim is:

1. An apparatus for monitoring tectonic activity comprising:

electromagnetic wave sensors with an observation frequency for detecting an electromagnetic wave occurring based on tectonic activity;

an amplifier for amplifying signals detected with said sensors, said observation frequency being set between a frequency of a few tens Hz and 1 kHz so as to eliminate influence of noises of a strong radiation power less than a few tens Hz and to eliminate noises of more than 1 kHz caused by thunder and of higher order modes propagating between the earth and the ionosphere, wherein said electromagnetic sensor comprises double circle shields, each of said double circle shields having a section for cutting a circumferentially directed current, and their sections are set opposite with respect to a center of a shield circle of each other.

2. The apparatus for tectonic activity monitoring according to claim 1, further comprising:

an apparatus power supply, wherein the observation frequency for detecting the electromagnetic wave occurred by tectonic activity is set to a frequency so as to avoid frequencies near integer multiples of power supply frequencies of the apparatuses power supply or other adjacent power supplies, and to be prime to each frequency component of power supply frequencies, and each amplifier has a narrow band width which is set to a frequency less than the minimum frequency component of the power supply frequencies.

3. The apparatus for tectonic activity monitoring according to claim 1, wherein:
the sensors are loopcoils or loopcoils connecting with capacitors; and
the resonating frequency of each sensor accords with the observation frequency, and influences of strong interference noises occurring from commercial power supplies are reduced by resonating the sensors with the observation frequency which occurs due to tectonic activity.

4. An apparatus for monitoring tectonic activity comprising:
electromagnetic wave sensors with an observation frequency for detecting an electromagnetic wave occurring based on tectonic activity:
an amplifier for amplifying signals detected with said sensors, said observation frequency being set between a frequency of a few tens Hz and 1 kHz so as to eliminate influence of noises of a strong radiation power less than a few tens Hz and to eliminate noises of more than 1 kHz caused by thunder and of higher order modes propagating between the earth and the ionosphere, wherein a plurality of amplifiers are provided, each amplifier being a narrow band width amplifier with band eliminating filters, and the band width of the band eliminating filters is narrow, said plurality of amplifiers being connected serially for obtaining a wide dynamic range, and the receiving signal being amplified gradually with the serially connected amplifiers for eliminating commercial power supply noises.

5. The apparatus for tectonic activity monitoring according to claim 4, further comprising:
an apparatus power supply, wherein the observation frequency for detecting the electromagnetic wave occurred by tectonic activity is set to a frequency so as to avoid frequencies near integer multiples of power supply frequencies of the apparatuses power supply or other adjacent power supplies, and to be prime to each frequency component of power supply frequencies, and each amplifier has a narrow band width which is set to a frequency less than the minimum frequency component of the power supply frequencies.

6. The apparatus for tectonic activity monitoring according to claim 4, wherein:
the sensors are loopcoils or loopcoils connecting with capacitors; and
the resonating frequency of each sensor accords with the observation frequency, and influences of strong interference noises occurring from commercial power supplies are reduced by resonating the sensors with the observation frequency which occurs due to tectonic activity.

7. An apparatus for monitoring tectonic activity comprising:
electromagnetic wave sensors with an observation frequency for detecting an electromagnetic wave occurring based on tectonic activity:
an amplifier for amplifiing signals detected with said sensors, said observation frequency being set between a frequency of a few tens Hz and 1 kHz so as to eliminate influence of noises of a strong radiation power less than a few tens Hz and to eliminate noises of more than 1 kHz caused by thunder and of higher order modes propagating between the earth and the ionosphere; and receiving signal conversion means for converting a received signal to a lower frequency to provide a narrow frequency band width of the receiving signal at low frequency range.

8. The apparatus for tectonic activity monitoring according to claim 7, further comprising:
an apparatus power supply, wherein the observation frequency for detecting the electromagnetic wave occurred by tectonic activity is set to a frequency so as to avoid frequencies near integer multiples of power supply frequencies of the apparatuses power supply or other adjacent power supplies, and to be prime to each frequency component of power supply frequencies, and each amplifier has a narrow band width which is set to a frequency less than the minimum frequency component of the power supply frequencies.

9. The apparatus for tectonic activity monitoring according to claim 7, wherein:
the sensors are loopcoils or loopcoils connecting with capacitors; and
the resonating frequency of each sensor accords with the observation frequency, and influences of strong interference noises occurring from commercial power supplies are reduced by resonating the sensors with the observation frequency which occurs due to tectonic activity.

10. An apparatus according to claim 9, wherein said loopcoils are each a many turned coil so as to improve sensitivity and said loopcoils are waterproofed so as to reduce loss.

11. A method for monitoring tectonic activity by a system composed of tectonic activity monitoring apparatuses placed at plural observation points and an observing center, the method comprising the steps of:
sensing electromagnetic waves with sensors for detecting a horizontal magnetic component and for sensing a vertical magnetic component to generate a signals based on sensed electromagnetic waves and amplifying the signals of the sensors;
providing a data processing device;
setting an observation frequency for detecting electromagnetic waves occurring from tectonic activity to frequencies between a few tens Hz and 1 kHz so as to eliminate the influence of noises of strong radiation power less than a few tens Hz and to eliminate the noise of thunder of more than 1 kHz of higher order modes propagating between the earth and the ionosphere;
sensing an anomaly of a horizontal magnetic component of electromagnetic waves which occur by tectonic activity and propagate to the sensors and detecting an incoming direction by an intensity difference between intensities of two directions being substantially perpendicular to each other, and finding an overlap region of the detected incoming directions of electromagnetic waves and choosing the over lap region as a focus region; and
sensing an anomaly of a vertical magnetic field of the electromagnetic waves which occur at a location near to the observation point by cause of tectonic activity of said focus region, and detecting tectonic activity at said focus region.

12. Method for monitoring tectonic activity according to claim 11, further predicting the scale of a predicted earthquake by referring to past data about the anomaly level of horizontal magnetic fields detected, the anomaly level of vertical magnetic field component and the estimated distance to the focus.

13. The method for tectonic activity monitoring according to claim 12, further comprising:
   estimating days from shear destruction or default destruction until the destruction of a basalt layer of an upper layer of mantle based on the predicted scale of earthquake.

14. The method for monitoring tectonic activity according to claim 11 comprising:
   observing the anomaly of the horizontal magnetic field as occurring by tectonic activity which is precausary of earthquake, and observing the anomaly of the vertical magnetic field that occurs at a location near the observing point as mechanical distortion propagated in earth from the focus region.

15. The method for monitoring tectonic activity according to claim 11 comprising:
   observing thee anomaly of the horizontal magnetic field as occurring by phenomena including microcracking of the mantle layer of a trench plate by tectonic activity which is precausary of earthquake, and observing the anomaly of the vertical magnetic field that occurs by phenomena including distortion of shear destruction or fault destruction.

16. The method for monitoring tectonic activity according to claim 11 comprising:
   setting the observation frequency to a frequency so as to avoid frequencies near integer multiples of power supply frequencies and to be prime to each frequency component of power supply frequencies, and setting the bandwidth of each of amplifiers to less than the minimum frequency component of the power supply frequencies.

* * * * *